United States Patent
Manders

(10) Patent No.: US 7,152,917 B2
(45) Date of Patent: Dec. 26, 2006

(54) WIND DEFLECTOR AND OPEN ROOF CONSTRUCTION PROVIDED THEREWITH

(75) Inventor: Peter Christiaan Leonardus Manders, Horst (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 11/127,051

(22) Filed: May 11, 2005

(65) Prior Publication Data

US 2005/0258669 A1    Nov. 24, 2005

(30) Foreign Application Priority Data

May 11, 2004   (EP) .................................. 04102029

(51) Int. Cl.
 *B60J 7/22* (2006.01)
(52) U.S. Cl. ..................................................... 296/217
(58) Field of Classification Search ................. 296/217
 See application file for complete search history.

(56) References Cited

U.S. PATENT DOCUMENTS 5,178,436 A    1/1993   Eberius et al. .............. 296/217

6,666,503 B1    12/2003   Sorensen ..................... 296/217
2003/0168892 A1    9/2003   Bohm et al. ................. 296/217

FOREIGN PATENT DOCUMENTS

| DE | 4039485 | * | 5/1992 | ................. 296/217 |
| DE | 101 37 363 C | | 11/2002 | |
| EP | 0 490 213 A | | 6/1992 | |

* cited by examiner

*Primary Examiner*—Dennis H. Pedder
(74) *Attorney, Agent, or Firm*—Westman, Champlin & Kelly P.A.; Steven M. Koehler

(57) ABSTRACT

A wind deflector is described for use at the leading end of a roof opening in the roof of a vehicle, which wind deflector is movable between a retracted position in which it substantially is positioned in a recess below the level of the upper surface of the roof and an extended position in which it at least partially extends above said level, and which wind deflector comprises a movable upper frame part, a lower frame part and a mesh material having an upper edge region attached to the upper frame part and a lower edge region attached to the lower frame part. The lower frame part together with the lower edge region of the mesh material is movable between a retracted position below said level and an extended position above said level.

16 Claims, 2 Drawing Sheets a.

b.

c.

d.

e.

WIND DEFLECTOR AND OPEN ROOF CONSTRUCTION PROVIDED THEREWITH

BACKGROUND OF THE INVENTION

The invention firstly relates to a wind deflector for use at the leading end of a roof opening in the roof of a vehicle, which wind deflector is movable between a retracted position in which it substantially is positioned in a recess below the level of the upper surface of the roof and an extended position in which it at least partially extends above said level, and which wind deflector comprises a movable upper frame part, a lower frame part and a mesh material having an upper edge region attached to the upper frame part and a lower edge region attached to the lower frame part.

In a known wind deflector of this type (see, for example, DE-C-10137363, EP-A-1342600 or DE-A-19518696) the lower frame part is attached to a stationary roof part of the vehicle or is defined by such a stationary roof part of the vehicle, such as a front beam of an open roof construction provided with a wind deflector. The position of such a lower frame part makes assembling the wind deflector difficult. Especially, it is very difficult to attach the lower edge region of the mesh material to such a lower frame part. When the mesh material is flexible, it often appears that after assembling folds are present in the mesh material which are difficult to remove.

Further it appears, that the state of the art wind deflectors of the type referred to above provide a flow pattern of the air flowing around the Further it appears, that the state of the art wind deflectors of the type referred to above provide a flow pattern of the air flowing around the wind deflector which is not versatile, and which cannot cope with differing circumstances in which the wind deflector has to perform.

SUMMARY OF THE INVENTION

Thus, it is an object of the present invention to provide an improved wind deflector.

Thus, in accordance with the present invention there is provided a wind deflector for use at the leading end of a roof opening in the roof of a vehicle, which wind deflector is movable between a retracted position in which it substantially is positioned in a recess below the level of the upper surface of the roof and an extended position in which it at least partially extends above said level, and which wind deflector comprises a movable upper frame part, a lower frame part and a mesh material having an upper edge region attached to the upper frame part and a lower edge region attached to the lower frame part, wherein the lower frame part together with the lower edge region of the mesh material is movable between a retracted position below said level and an extended position above said level.

When the wind deflector in accordance with the present invention has to be assembled, the lower frame part is moved towards its extended position above the level of the upper surface of the roof. As a result the lower frame part becomes very accessible such that the lower edge region of the mesh material can be attached thereto without any problem. Further, the position of the lower frame part, and thus the position of the upper frame part and mesh material extending therebetween, can be adapted to cope with different circumstances in which the wind deflector has to perform. Basically, any position of the wind deflector between the fully retracted position, a partly extended position in which the lower frame part still is positioned below said level, and a fully extended position in which both the upper frame part, mesh material and lower frame part are positioned above said level, can be chosen freely. In the first mentioned position (fully retracted) the wind deflector is not operative. In the second mentioned position (partly extended) the wind deflector basically functions as a state of the art wind deflector of the type referred to above, in which the main air flow is directed above the upper frame part with a smaller, secondary air flow through the mesh material, whereas in the third position (fully extended) also an additional air flow below the lower frame part can be generated, promoting the characteristics of the wind deflector (especially its noise-preventing characteristics).

It is noted, that DE-C-10137363 already shows a wind deflector having a movable upper frame part and a movable lower frame part. However, the lower frame part of this known wind deflector cannot be compared with the lower frame part of the present wind deflector, because in this state of the art wind deflector the lower edge region of the mesh material is not attached to said lower frame part, but still to a stationary roof part of the vehicle.

In a preferred embodiment of the wind deflector according to the present invention the upper frame part is pivotable around a first axis extending transversally with respect to the vehicle, whereas the lower frame part likewise is pivotable around a second axis extending transversally with respect to the vehicle. In such an embodiment, the wind deflector is of the pivoting type. However, this does not preclude the possibility that the wind deflector is provided with a mechanism for realising a pure translational motion between its fully extended and fully retracted positions or translational motion with pivoting.

When the wind deflector is of the pivoting type as mentioned above, preferably the first and second pivot axes coincide. That means, that only one pivot axis extending transversally is provided. This makes the mechanism of the wind deflector less complicated, cheaper and more reliable.

The upper and lower frame parts may have a very simple construction. For example, in a top plan view of the vehicle the upper and lower frame parts are shaped as U-shaped bars having their outer ends positioned at the first and second pivot axes, respectively.

Preferably, the upper frame part is spring-loaded towards its extended position. Only when being released (for example by a movable closure means of an open roof construction provided with such a wind deflector) it will move from the retracted position towards the extended position. Generally, firstly the upper frame part will move towards an extended position, and after a short while also the lower frame part will move towards an extended position, during which the upper frame part continues its movement towards its fully extended position.

The spring-load on the upper frame part can be generated by a first spring member acting between the upper frame part and a stationary roof part of the vehicle. For example, such a spring member comprises a torsion spring or a compression spring.

The spring-load on the lower frame part can be generated by a second spring member acting between said lower frame part and the upper frame part. Again, such a spring member may comprise a torsion spring or a compression spring.

Although in the above a wind deflector has been mentioned, in which a relative movement between the upper frame part and lower frame part will occur, this is not strictly necessary. Thus, it is also possible that the relative position between the upper and lower frame parts is fixed, in which situation the mesh material can be rigid. However, a disadvantage of such a construction is, that the recess for housing the wind deflector in its fully retracted position should be deeper then in the case of a wind deflector, in which the upper frame part and lower frame part can move relative to each other, such that in the fully retracted position of the wind deflector the upper and lower frame parts are positioned at a short distance from each other.

For increasing the effect of the wind deflector, preferably the mesh material has a main portion extending transversally with respect to the vehicle, and two sub portions at the opposite outer ends of the main portion extending substantially longitudinally with respect to the vehicle. The two sub portions contribute to the creation of a favourable flow pattern around the wind deflector and above the roof opening in the stationary roof of the vehicle.

The invention secondly relates to an open roof construction or roof assembly for a vehicle, comprising a roof opening defined in the roof of the vehicle, which roof opening can be opened and closed by a movable closure means, wherein in front of said roof opening a wind deflector according to the present invention is positioned.

BRIEF DESCRIPTION OF THE DRAWINGS

Hereinafter the invention will be elucidated referring to the drawing, in which embodiments of the wind deflector in accordance with the present invention are illustrated.

DETAILED DESCRIPTION OF THE ILLUSTRATIVE EMBODIMENTS

Figure 1:
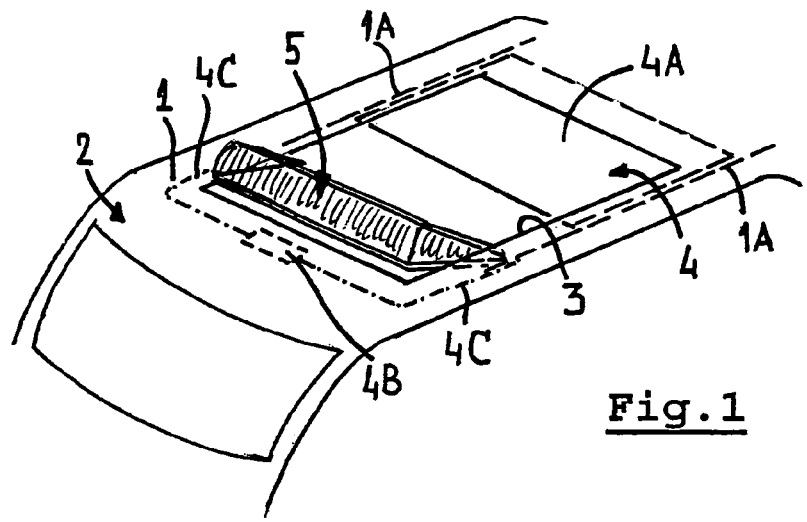
FIG. 1 shows, schematically, a perspective view of a part of a vehicle provided with a wind deflector according to the present invention.

Firstly, reference is made to FIG. 1. In a stationary roof 1 of a vehicle 2 a roof opening 3 is provided which can be closed and opened by a roof assembly having a movable closure means 4 that can include, but not be limited to a panel/folding roof 4A operably connected to a drive motor or hand crank 4B via cables 4C. The panel/folding roof 4A and/or lift mechanism connected thereto can slide on stationery guide 1A. The foregoing elements are schematically illustrated since they are well known to those skilled in the art.

Figure 3:
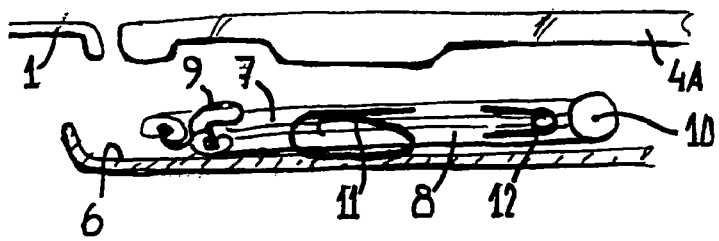
FIG. 3 shows, in a schematical side elevational view, different positions of the wind deflector.
Figure 3:
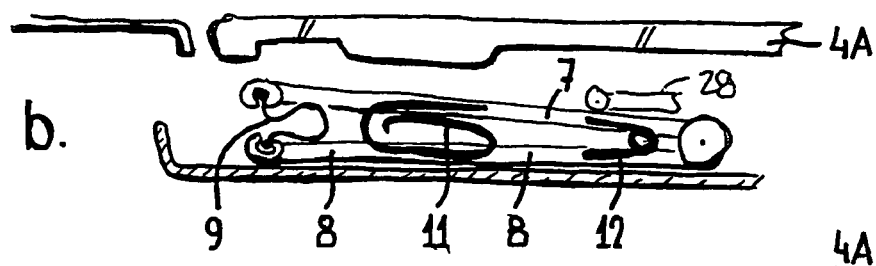
Figure 3:
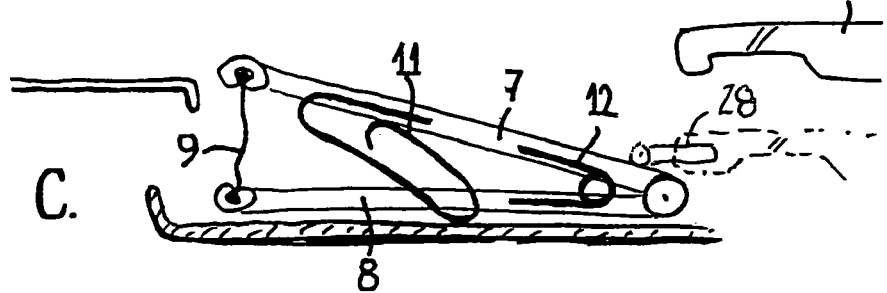
Figure 3:
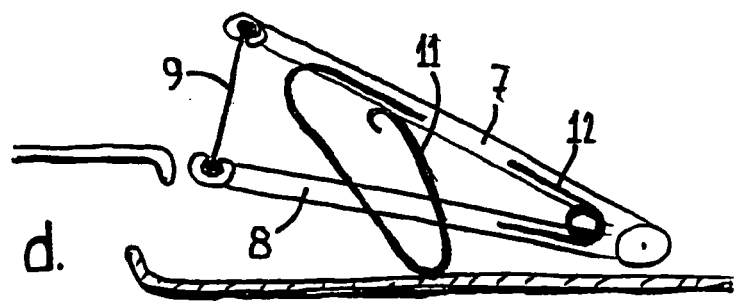
Figure 3:
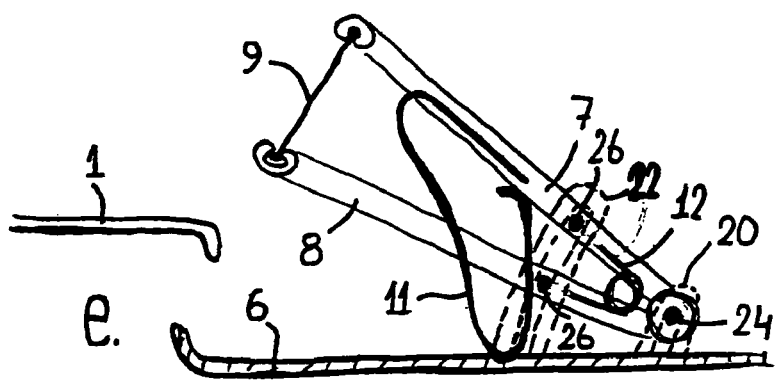

At the leading end of the roof opening 3 a wind deflector 5 is provided. The wind deflector 5 is of the type which is movable between a retracted position in which it substantially is positioned in a recess 6 (see FIGS. 3 and 4) below the level of the upper surface of the roof 1 and an extended position in which it at least partially extends above said level.

Figure 2:
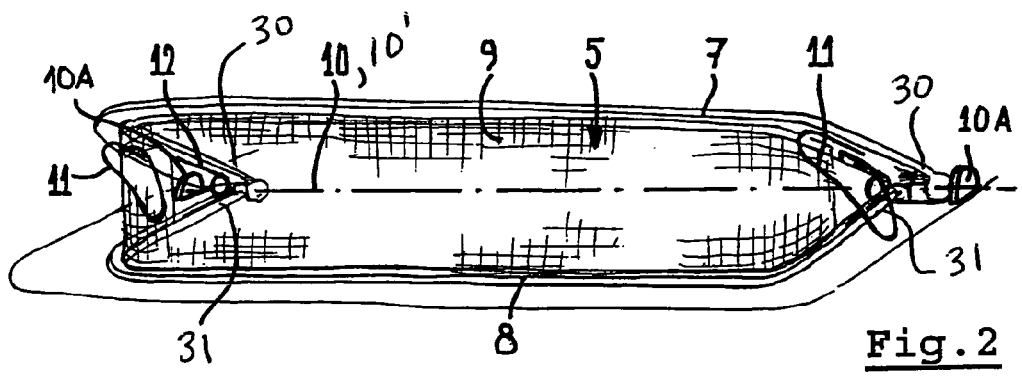
FIG. 2 shows, likewise schematically and on a larger scale, a perspective view of the wind deflector illustrated in FIG. 1.

Referring to FIG. 2, the wind deflector 5 comprises a movable upper frame part 7, a lower frame part 8 and a mesh material 9 having an upper edge region attached to the upper frame part 7 and a lower edge region attached to the lower frame part 8.

The upper and lower frame parts 7, 8 are shaped as U-shaped bars having their respective outer ends 30 and 31 pivotally positioned at respective pivot axes 10 and 10' extending transversally with respect to the vehicle, and wherein the upper and lower frame parts 7 and 8 being pivotally secured to portions of the roof 1 forming the recess directly or indirectly through an intermediate member (schematically illustrated in FIG. 2 at 10a)

A first spring member 11 is acting between the upper frame part 7 and a stationary part of the roof 1, and tries to urge the upper frame part 7 towards its fully extended position. Such a first spring member 11 can be positioned at both lateral sides of the wind deflector 5.

A second spring member 12 is positioned and acts between the upper frame part 7 and lower frame part 8, such as to urge the upper and lower frame parts 7 and 8 apart.

As is clearly visible in FIG. 2, the mesh material has a main, central, portion extending transversally with respect to the vehicle, and two sub portions at the opposite outer ends of the main portion extending substantially longitudinally with respect to the vehicle.

The wind deflector functions as follows. FIG. 3a shows the closure means 4 in a fully closed position, in which it urges the upper frame part 7 against the spring-load of the first spring member 11 towards the lower frame part 8 into the recess 6. The mesh material 9 has assumed a collapsed position. Now, the wind deflector 5 is in its fully retracted position.

In one embodiment, movement of the wind deflector 5 is co-ordinated with movement of the closure means 4. Pusher 28 is illustrated as an exemplary mechanism for controlling movement of the wind deflector 5 or parts thereof (herein by selectively engaging the wind deflector 5 by riding upon the upper frame member 7). Pusher 28 can be operably coupled with linking members to elements of the closure means 4 such as the lift mechanism or the panel 4A. Alternatively, a separate drive motor can be operatively coupled to the wind deflector 5 or pusher 28. As appreciated by those skilled in the art, other types of mechanisms could be used. It should also be noted that it is not necessary that there is a 1:1 relation between the movements of panel 4A and pusher 28 (for example activating the motor 4B could lead firstly to a movement of the panel 4A and only a short while later a movement of the pusher 28. Again, such mechanisms are known and need no further explanation.

When the closure means 4 starts to move towards its open position the upper frame part 7 will have started to move away from the lower frame part 8 (FIG. 3b). This movement is caused by the spring-load of the first spring member 11, but also by the spring-load of the second spring member 12.

In FIG. 3c the closure means 4 still is in the process of being moved away further, and the upper frame part 7 has moved apart from the lower frame part 8. The mesh material 9 almost has reached its fully tensioned position.

Finally, FIGS. 3d and 3e show the final movement of the wind deflector 5 under influence of spring member 11 towards its final position (FIG. 3e) in which the lower edge region of the mesh material 9 is positioned at a level above the upper surface of the roof 1 of the vehicle.

It is clear, that in the position illustrated in FIG. 3e the first spring member 11 maintains the upper frame part 7 in the illustrated position, whereas the second spring member 12 maintains the lower frame part 8 in its spaced position relative to the upper frame part 7.

It is noted, that the pusher 28 or other suitable means may be provided for positioning the wind deflector 5 in any desired position between its fully retracted position according to FIG. 3a and its fully extended position according to FIG. 3e. Basically, any position of the wind deflector 5 between the fully retracted position, a partly extended position in which the lower frame part 8 still is positioned below said level, and a fully extended position in which both the upper frame part 7, mesh material 9 and lower frame part 8 are positioned above said level, can be chosen freely. In the first mentioned position (fully retracted) the wind deflector 5 is not operative. In the second mentioned position (partly extended) the wind deflector 5 basically functions as a state of the art wind deflector of the type referred to above, in which the main air flow is directed above the upper frame part with a smaller, secondary air flow through the mesh material, whereas in the third position (fully extended) also an additional air flow below the lower frame part 8 can be generated, promoting the characteristics of the wind deflector (especially its noise-preventing characteristics).

In the illustrated embodiment, the upper frame part 7 and lower frame part 8 both pivot around the same axis 10. However, it is also conceivable that different pivot axes are provided which do not coincide.

Figure 4:
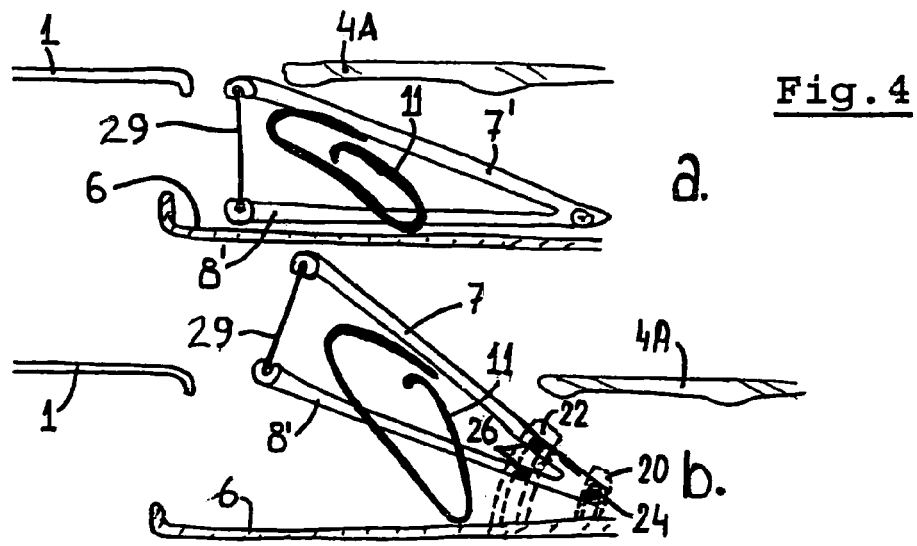
FIG. 4 shows, in a side elevational view, different positions of an alternative wind deflector.

Finally, FIG. 4*a* and 4*b* show an alternative embodiment of a wind deflector, in which the upper frame part 7' and lower frame part 8' form integrally connected parts, such that the relative position between the upper and lower frame parts 7' and 8' is fixed. In such an embodiment, the mesh material 29 may be rigid (for example a perforated metal sheet). Further, in the embodiment shown in FIG. 4 only spring member 11 is needed. Spring member 12 may be omitted. In this illustration, pusher 28 has been omitted; however, it or another suitable drive mechanism can be used to control movement of the wind deflector as appreciated by those skilled in the art.

In the foregoing embodiments, the wind deflector 5 is of the pivoting type. However, this does not preclude the possibility that the wind deflector 5 is provided with a mechanism for realising a pure translational motion between its fully extended and fully retracted positions or translational motion with pivoting.

Such a mechanism is schematically illustrated by guides 20 and/or 22 with dashed lines in FIGS. 3E and 4B. The guides 20 and 22 coupled movably or in a fixed position to roof 1 receive guide element 24, 26 on frame parts 7, 7', 8, 8', respectively.

Although the present invention has been described with reference to preferred embodiments, workers skilled in the art will recognize that changes may be made in form and detail without departing from the spirit and scope of the invention.

What is claimed is:

1. A wind deflector for use at the leading end of a roof opening in the roof of a vehicle, which wind deflector is movable between a retracted position in which it substantially is positioned in a recess below the level of the upper surface of the roof and an extended position in which it at least partially extends above said level, and which wind deflector comprises a movable upper frame part, a lower frame part and a mesh material having an upper edge region attached to the upper frame part and a lower edge region attached to the lower frame part, wherein the upper frame part is pivotable around a first axis extending transversally with respect to the vehicle and the lower frame part is pivotable around a second axis extending transversally with respect to the vehicle, wherein the first and second axes coincide and are stationary, and wherein the lower frame part together with the lower edge region of the mesh material is movable between a retracted position below said level and an extended position above said level.

2. The wind deflector according to claim 1, wherein in a top plan view of the wind deflector the upper and lower frame parts are shaped as U-shaped bars having their outer ends positioned at the first and second pivot axes, respectively.

3. The wind deflector according to claim 1, and further comprising a spring member configured to urge the upper frame part towards its extended position.

4. The wind deflector according to claim 3, wherein the spring member is configured to act between the upper frame part and a stationary roof part of the vehicle.

5. The wind deflector according to claim 3, wherein a the spring member is configured to act between said lower frame part and the upper frame part.

6. The wind deflector according to claim 1, wherein the relative position between the upper and lower frame parts is fixed and wherein the mesh material is rigid.

7. The wind defector according to claim 1, wherein the mesh material has a main portion extending transversally with respect to the vehicle, and two sub portions at the opposite outer ends of the main portion extending substantially longitudinally with respect to the vehicle.

8. A roof assembly for a vehicle having a roof opening defined in a roof of the vehicle, the roof assembly comprising:

a movable closure element adapted to close and open at least partially the roof opening; and a wind deflector adapted to be disposed at a leading end of a roof opening in the roof of the vehicle, which wind deflector is movable between a retracted position in which it substantially is positioned in a recess below the level of the upper surface of the roof and an extended position in which it at least partially extends above said level, and which wind deflector comprises a movable upper frame part, a lower frame part and a mesh material having an upper edge region attached to the upper frame part and a lower edge region attached to the lower frame part, wherein the upper frame part is pivotable around a first axis extending transversally with respect to the vehicle and the lower frame part is pivotable around a second axis extending transversally with respect to the vehicle, wherein the first and second axes coincide and are stationary, and wherein the lower frame part together with the lower edge region of the mesh material is movable between a retracted position below said level and an extended position above said level.

9. The roof assembly according to claim 8, wherein in a top plan view of the roof assembly the upper and lower frame parts are shaped as U-shaped bars having their outer ends positioned at the first and second pivot axes, respectively.

10. The roof assembly according to claim 8, and further comprising a spring member configured to urge the upper frame part towards its extended position.

11. The roof assembly according to claim 10, wherein the spring member is configured to act between the upper frame part and a stationary roof part of the vehicle.

12. The roof assembly according to claim 10, wherein the spring member is configured to act between said lower frame part and the upper frame part.

13. The roof assembly according to claim 8, wherein the relative position between the upper and lower frame parts is fixed and wherein the mesh material is rigid.

14. The roof assembly according to claim 8, wherein the mesh material has a main portion extending transversally with respect to the vehicle, and two sub portions at the opposite outer ends of the main portion extending substantially longitudinally with respect to the vehicle.

15. A wind deflector for use at the leading end of a roof opening in the roof of a vehicle, which wind deflector is movable between a retracted position in which it substantially is positioned in a recess below the level of the upper surface of the roof and an extended position in which it at least partially extends above said level, and which wind deflector comprises a movable upper frame part, a lower frame part and a mesh material having an upper edge region attached to the upper frame part and a lower edge region attached to the lower frame part, wherein the upper frame part and the lower frame part are configured to pivot around axes such that a distance between the upper edge region and the lower edge region changes in length from the retracted position to the extended position.

16. The deflector of claim 15 where the upper edge region and the lower edge region are closest together in the retracted position.

* * * * *